L. W. CHUBB.
ELECTRICAL MEASURING INSTRUMENT.
APPLICATION FILED AUG. 10, 1916.
1,295,853.
Patented Mar. 4, 1919.
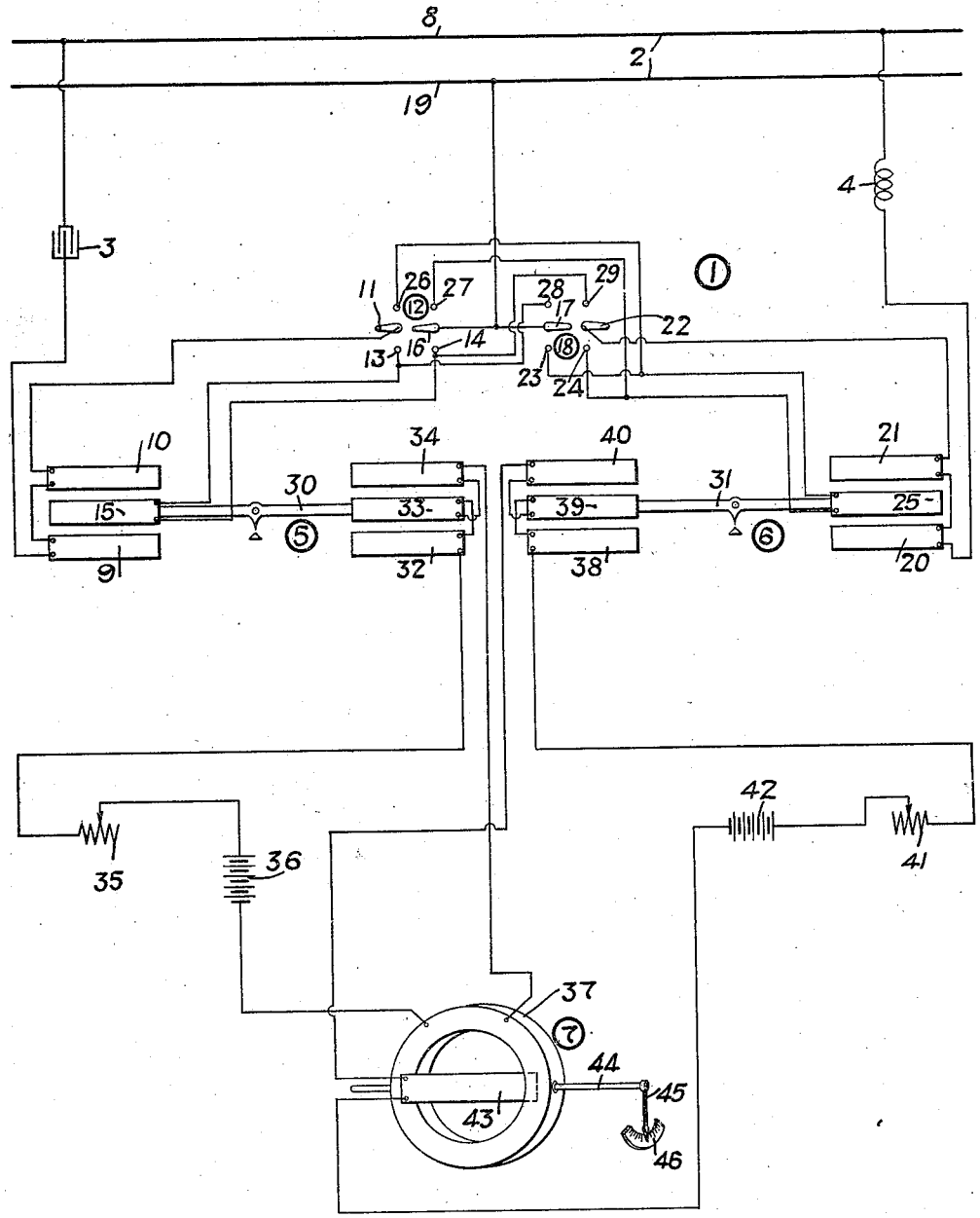
WITNESSES:
INVENTOR
Lewis W. Chubb.
BY
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,295,853.     Specification of Letters Patent.     Patented Mar. 4, 1919.

Application filed August 10, 1916. Serial No. 114,175.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to such instruments as are employed for measuring the distortion factors of alternating-current waves.

One object of my invention is to provide an electrical measuring instrument of the above indicated character that shall have means for determining the product of the differential and integral-distortion factors of an alternating-current wave.

Another object of my invention is to provide an instrument that shall have means for determining the ratio of the mean-square value of the voltage wave to the product of the square-root of the mean-square values of the differential and integral values of the voltage wave.

A further object of my invention is to provide an instrument of the above indicated character that shall be simple to operate and accurate in its indications.

It has been determined that alternating-current problems may be easily solved without the necessity of knowing the shape of the waves if recourse is had to the constants of the circuits, such, for example, as the inductance, the capacitance, the resistance and the differential and integral-distortion factors. The differential-distortion factor of a wave is the ratio of the square-root of the mean-square value of the first derivative of the wave with respect to time to the square-root of the mean-square value of the first derivative of the equivalent sine wave. The integral distortion factor of a wave is the ratio of the square-root of the mean-square value of the integral of the wave with respect to time to the square-root of the mean-square value of the integral of the equivalent sine wave.

The current that traverses a condenser which is connected in shunt relation to a circuit is the differential of the voltage of the circuit, and the current that traverses a reactor which is connected in shunt relation to the circuit is the integral of the voltage of the circuit.

In the carrying out of my invention, I cause a two-winding dynamometer to have one of its windings supplied with current proportional to the differential and its other winding with an in-phase current proportional to the integral of the voltage of the circuit. Thus, the dynamometer will indicate the product of these two values. I so arranged the device that, by a simple reconnection of the circuits, each of the windings of the dynamometer may be supplied with current proportional to the square-root of the mean-square value of the voltage to cause the dynamometer to indicate the mean-square of the voltage. Thus, if the latter indication of the dynamometer is divided by the former indication, a convenient factor or the reciprocal of the product of the integral and distortion factors is obtained.

The single figure of the accompanying drawing is a diagrammatic view of a measuring device or instrument embodying my invention.

A measuring device 1 is operatively connected to an alternating-current circuit 2 and comprises, in general, a condenser 3, a reactor 4, two differential balances or comparators 5 and 6, such as Kelvin balances, and a two-winding dynamometer 7.

One terminal of the condenser 3 is connected to the conductor 8 of the circuit 2 and the other terminal of the condenser is connected to one terminal of the stationary winding 9 of the instrument 5. The other terminal of the winding 9 is connected to one terminal of the stationary winding 10 of the instrument 5. The other terminal of the winding 10 is connected to the movable contact member 11 of a double-pole double-throw switch 12 the stationary contact members 13 and 14 of which are connected to the respective terminals of the movable winding 15 of the instrument 5. The movable contact member 16 of the switch 12 is operatively connected to the movable contact member 17 of a double-pole, double-throw switch 18 and also to the conductor 19 of the circuit 2.

One terminal of the reactor 4 is connected to the conductor 8 of the circuit 2 and the other terminal of the reactor 4 is connected to one terminal of the stationary winding 20 of the instrument 6. The other terminal of the winding 20 is connected to one terminal of the stationary winding 21, and the other terminal of the winding 21 is connected to the movable contact member 22 of the switch 18. The stationary contact members 23 and 24 of the switch 18 are connected to the respective terminals of the movable winding 25 of the instrument 6 and also to the stationary contact members 26 and 27 of the switch 12. The stationary contact members 28 and 29 of the switch 18 are operatively connected to the stationary contact members 13 and 14 of the switch 12.

When the movable contact members 11, 16, 17 and 22 are thrown into engagement with the stationary contact members 13, 14, 23 and 24, respectively, current proportional to the differential of the voltage of the circuit 2 will traverse the windings 9, 10 and 15 of the instrument 5 and current proportional to the integral of the voltage of the circuit 2 will traverse the windings 20, 21 and 25 of the instrument 6. Thus, since the windings 9 and 10 are so connected as to react upon the winding 15, and the windings 20 and 21 are so connected as to react upon the winding 25, the movable members 30 and 31 of the instruments 5 and 6, respectively, will move from their control positions because of the currents traversing the windings.

The windings 32, 33 and 34 of the instrument 5 are connected in series with a variable resistor 35, a source 36 of electromotive force and the winding 37 of the dynamometer 7. The windings 32, 33 and 34 are so connected, that they tend to oppose the force produced by the current that traverses the windings 9, 10 and 15. If the resistance of the resistor 35 is so adjusted that sufficient current traverses the windings 32, 33 and 34 of the instrument 5, current proportional to the differential of the voltage of the circuit 2 traverses the winding 37 of the dynamometer 7.

The windings 38, 39 and 40 of the instrument 6 are connected in series with the variable resistor 41, a source 42 of electromotive force and the winding 43 of the dynamometer 7. The windings 38, 39 and 40 are so connected that they oppose the force exerted between the windings 20, 21 and 25. If the resistance of the resistor 41 is so adjusted that sufficient current traverses the windings 38, 39 and 40 to balance the instrument 6, current proportional to the integral of the voltage of the circuit 2 traverses the winding 43.

Since the current that traverses the winding 37 is proportional to the differential of the voltage of the circuit 2 and the current that traverses the winding 43 is proportional to the integral of the voltage of the circuit 2, the winding 43, which is mounted upon a shaft 44 having a pointer, will turn an amount proportional to the product of the square-root of the mean-square values of the differential and integral values of the voltage of the circuit 2, and the pointer 45 will coöperate with a scale 46 to indicate this value.

If the movable contact members 11, 12, 17 and 22 of the switches 12 and 18 are moved into engagement with the stationary contact members 26, 27, 28 and 29, respectively, the windings 9, 10, 15, 20, 21 and 25 of the instruments 5 and 6 will be supplied with currents proportional to the square-root of the mean-square value of the voltage of the circuit 2. If the resistance of the resistors 35 and 41 are so adjusted that sufficient current traverses the windings 32, 33, 34, 38, 39 and 40 to balance the instruments 5 and 6 current will traverse each of the windings 37 and 43 that is proportional to the square-root of the mean-square value of the voltage of the circuit 2. Since the pointer 45 of the instrument 7 indicates the product of the currents traversing the windings 37 and 43, it will indicate, in this instance, the mean-square value of the voltage in the circuit 2.

Since the ratio of the mean-square value of the voltage of the circuit to the product of the square-root of the mean-square values of the differential and integral values of the voltage wave impressed upon the circuit, is a necessary factor in the solution of the certain alternating-current problems, it will be understood that, if the latter indication of the meter 7 is divided by the former indication, this desirable factor will be obtained.

I do not limit my invention to the particular structure and arrangement illustrated, as it may be variously modified without departing from the spirit and scope of the invention as set forth in the appended claims.

I claim as my invention:

1. In a measuring device for an electric circuit, the combination with two differential balances, a reactor connected in circuit with the windings on one end of one of the balances and a condenser connected in circuit with the windings on the corresponding end of the other balance, of a dynamometer, the windings on the other ends of the balances being connected in circuit with the respective windings of the dynamometer.

2. The method of determining the product of the differential and integral values of an alternating-current wave which consists in supplying a dynamometer with two direct currents one of which is proportional to the integral and the other to the differential value of the voltage of the alternating-current wave.

3. In an alternating-current circuit, the combination with a dynamometer, of means for supplying one of the windings of the dynamometer with current proportional to the integral of the voltage of the alternating-current circuit and the other winding with current proportional to the differential of the voltage of the alternating-current circuit.

4. In an alternating-current circuit, the combination with two coöperating windings, of means for supplying one of the windings with current proportional to the integral and the other winding with current proportional to the differential value of the voltage of the circuit.

5. In an alternating-current circuit, the combination with a measuring instrument, of means for supplying one of the windings of the instrument with direct current proportional to the integral of the voltage of the alternating-current circuit and its other winding with direct current proportional to the differential of the voltage of the alternating-current circuit.

6. The method of determining the reciprocal of the product of the differential and integral-distortion factors of an alternating-current wave which consists in supplying a dynamometer with two currents proportional to the integral and the differential values of the voltage wave, then supplying the dynamometer with currents proportional to the square root of the mean square value of the voltage wave and dividing the former indication of the dynamometer by the latter.

7. In an electric circuit, the combination with two differential balances, of means for supplying the windings on one end of one of the balances with current proportional to the differential of the voltage of the circuit, means for supplying the windings on one end of the other balance with current proportional to the integral of the voltage of the circuit, and means operatively connected to the other ends of the balances adapted to be actuated in accordance with the product of the said differential and integral values.

8. In a measuring system for an alternating-current circuit, the combination with two differential balances, of a condenser connected to the circuit and in series with the windings on one end of one of the balances, a reactor connected to the circuit and in series with the windings on one end of the other balance, and a dynamometer, the windings of which are connected to a source of direct current and to the other windings on the balances.

9. In a measuring system for an alternating-current circuit, the combination with two current balances, of means for supplying the windings on one end of one balance with current proportional to the differential of the voltage of the circuit, means for supplying the windings on one end of the other balance with current proportional to the integral of the voltage of the circuit, and means for measuring the product of the currents necessary to be supplied to the other windings of the balances to balance the same.

10. The method of determining the reciprocal of the product of the differential and integral-distortion factors of an alternating-current wave which consists in supplying a dynamometer with currents proportional to the square-root of the mean-square of the integral and differential values of the voltage wave, then supplying the dynamometer with current proportional to the square-root of the mean-square values of the voltage wave and dividing the latter by the former indication of the dynamometer.

In testimony whereof, I have hereunto subscribed my name this 27th day of July, 1916.

LEWIS W. CHUBB.

Copies of this patent may be obtained for five cents each, by addressing the "Commissioner of Patents, Washington, D. C."